June 25, 1940. C. E. HENRIOD, FILS 2,205,833
AUTOMATIC CLUTCH
Filed June 29, 1937 2 Sheets-Sheet 1

Inventor
CHARLES EDWARD HENRIOD, FILS

By Bailey Parsons
Attorney

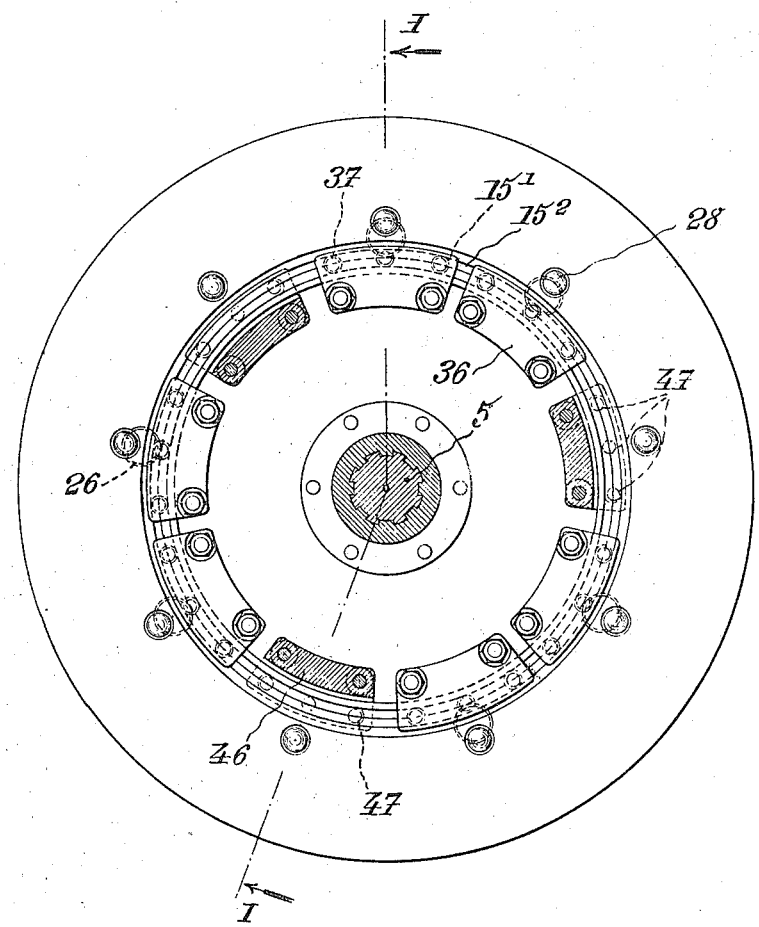

Patented June 25, 1940

2,205,833

UNITED STATES PATENT OFFICE 2,205,833

AUTOMATIC CLUTCH

Charles Edouard Henriod, Fils, Neuilly-sur-Seine, France

Application June 29, 1937, Serial No. 151,020
In Luxemburg February 1, 1937

3 Claims. (Cl. 192—105)

The present invention relates to automatic clutches and it is more especially, although not exclusively, concerned with clutches of this kind for use in connection with variable ratio transmissions for automobile vehicles.

The object of the present invention is to arrange the control means of these clutches in such manner that they can work in a simpler and more efficient manner and that the disengagement of the clutch can take place without difficulty and without delay, which is an essential condition of the proper working of an automatic clutch.

According to the essential feature of the present invention, whereas the clutch is controlled by centrifugal masses, in some cases at least cooperating with means such as springs which exert a force opposing that developed by the centrifugal masses, means for transmitting the action of the driving torque or of the resistant torque, and so on, said centrifugal masses are adapted to act substantially directly on the coacting parts of the clutch through balls or rollers housed in recesses the walls of which are inclined in such a manner that the effect resulting from the variation of the centrifugal force and of the driving effort directly and immediately produces a relative displacement of said balls and said inclined walls and consequently a modification of the degree of application of the coacting parts of the clutch with respect to one another.

Another feature of the present invention consists in connecting a clutch of the type above referred to with the member to be driven through means deformable in the direction of the axis of said member, said means being preferably given an elasticity such that the whole can constitute, at least partly, the opposing means which cooperate in the control of the clutch.

Other features of the present invention will result from the following description of some specific embodiments thereof.

Preferred embodiments of the present invention will be hereinafter described, with reference to the accompanying drawings, given merely by way of example, and in which:

Fig. 2 is a sectional view on the line II—II of Fig. 1.

Figure 1:
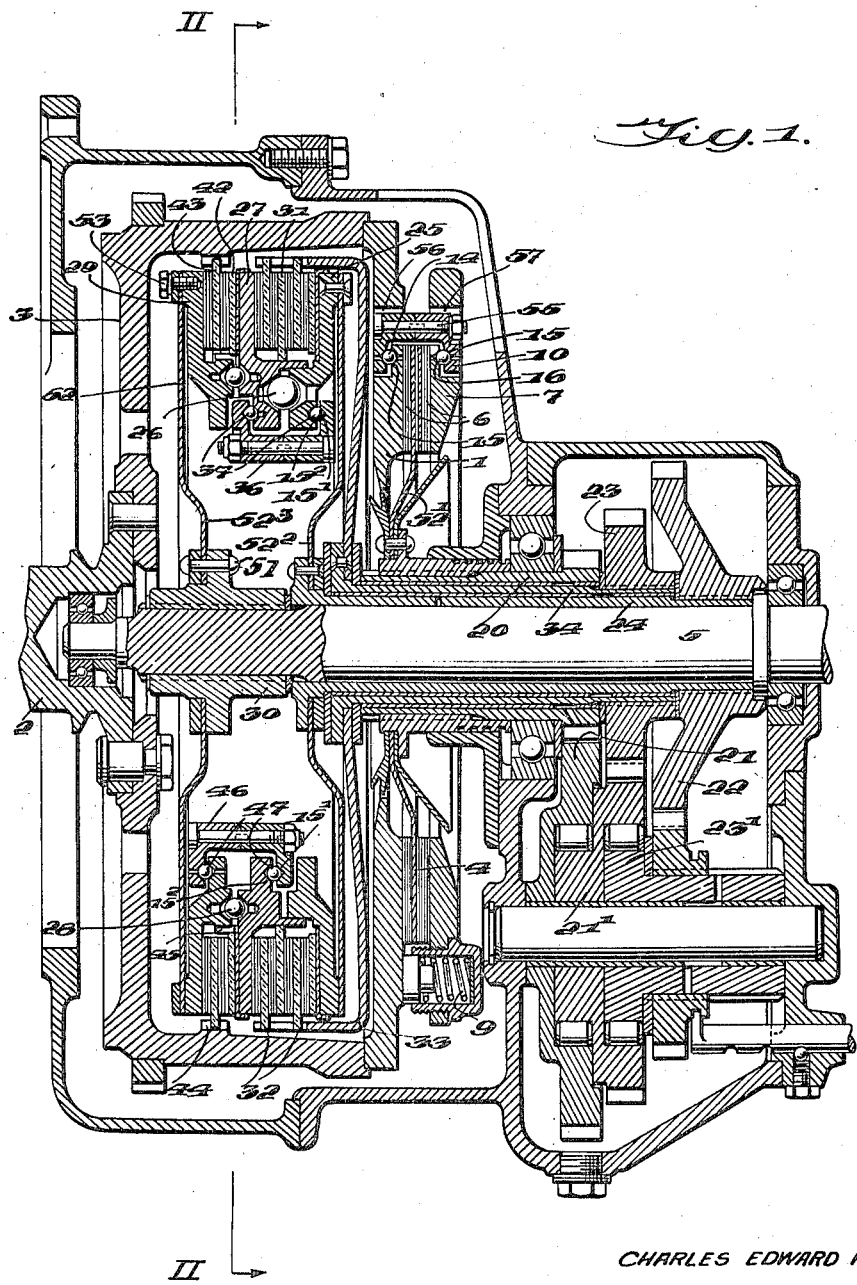
Fig. 1 is an axial sectional view on the line I—I of Fig. 2 of a gear box for automobile vehicles including automatic clutches made according to the present invention.

In the following description, it will be supposed that it is desired to obtain an automatic clutch adapted to be used in connection with an automatic variable speed transmission for automobile vehicles.

Such an automatic clutch system will be made as follows:

Concerning the clutch mechanism proper, it is made in any suitable manner, and for instance as follows:

It is desired to connect through coupling means adapted to be gradually brought into or out of action, a member 1, driven by a driving shaft 2 and a fly-wheel 3, with a member 4, connected through means which will be specifically described hereinafter with a driven shaft 5. It has been supposed, by way of example, that the member to be driven, such as 4, consists of a plate or disc carrying on both of its faces friction elements 6 intended to be caught between the driving member 1, consisting of a disc or plate, and an annular disc member turning together with said member 1 and designated by reference number 7. Therefore, when the coupling means are in operation, plate 4 is tightly held in a kind of annular pair of jaws.

Concerning the device for automatically controlling the clutch, I make use, according to the invention, of the following arrangement:

The disengagement of the clutch is obtained, in the usual manner, through elastic means consisting, in the example illustrated by the drawings, of springs 9 distributed along the circumferential periphery of annular disc member 7.

In the embodiment shown, the driving members 1 and 7 are applied against the respective opposite faces of the plate 4 to be driven by means of masses 10. Each of the centrifugal masses is made of two flanges, of the shape of circular sectors and which are connected together by bolts 55, the transverse section of the mass thus constituted having the shape of a U the legs of which overlap the plates or discs 1 and 7 provided on either side of the plate or plates 6 carrying the frictional elements of the corresponding clutch. These masses are housed in apertures 56, 57 provided in parts 1 and 7, and are prevented from moving axially in these apertures because the faces of their legs are constantly in contact with balls 14 and 16 which themselves bear respectively on elements 1 and 7 of the clutch. These balls 14 and 16 are housed in corresponding recesses the walls of which, considered in the radial direction of plate members 1 and 7, are inclined as shown at 15, over a length and at an angle which are suitably chosen for the desired purpose as will be hereinafter explained. On the other hand, these recesses are made of a depth (in the axial direction) such that the adjacent faces of the legs of mass 10 and driving members 1 and 7 are always kept at a distance from each other.

Between mass 10 and the inner walls of the holes 56, 57 provided in members 1 and 7 respectively, I leave a radial interval the width of which is at least equal to one half of the length of recesses 15. It follows that mass 10 is maintained only by balls 14 and 16 and can therefore move radially with respect to plates 1 and 7 when the latter are rotated by driving shaft 2. As a consequence of this radial displacement, balls 14 and 16 are driven in the same direction and move along the inclined walls 15. When the speed of plate 1 increases, I thus obtain a gradual movement of members 1 and 7 towards each other and consequently member 4 is tightly held between the driving parts 1 and 7, the axial thrust increasing in accordance with the square of the speed of driving shaft 2. As the movement of members 1 and 7 towards each other is obtained through balls 14 and 16 and as the edges of the orifices 56 and 57 remain always out of contact with mass 10, the relative movements between the parts which produce the engagement of cooperating parts of the clutch take place practically without friction and masses 10 occupy, at any time, positions, in the radial direction, corresponding to the speed of the driving shaft 2. It should be noted that the action of balls 14 and 16 also produces an effort tending automatically to engage the parts of the clutch with one another because plate member 7 is driven merely by the balls themselves which cooperate with the inclined walls of the recesses. Therefore, the total effort tending to bring the clutch into action is the resultant of two forces at right angles to each other, to wit, (1) the centrifugal force, and (2) the tangential driving effort of plate 7. When the speed of driving shaft 2 decreases, balls 14 and 16, driven by masses 10, automatically come back toward their central position, thus reducing the effort of application of the clutch elements against each other. With such an arrangement, no large force opposes the action of springs 9 which urge members 1 and 7 away from the driven element 4.

In the drawings, I have shown, by way of example, a three speed gear box with reverse gear, in which automatic clutches of the kind above described are advantageously employed. As this gear box does not constitute, in itself, the object of the invention it will be described but shortly, but sufficiently for explaining the conditions under which these clutches are brought into play.

The clutch mechanism as above described serves to couple the driving shaft 2 with the driven shaft 5 for the first gear drive. For this purpose, masses 10 and recesses 15 are devised in such manner that for an increasing speed of shaft 2 from zero up to a predetermined limit value corresponding to the bringing into action of the first gear combination, I obtain, as a consequence of the radial displacement of masses 10, a gradual engagement of the clutch for driving disc 4. The latter is connected to an external sleeve 20 freely rotatable about shaft 5 and this sleeve drives shaft 5 through gear trains 21 and 22. The transmission pinion of train 21 is connected to the transmission pinion of an adjacent gear train 23 (corresponding to second gear) through a free wheel device $21^1$. Gear train 22 rotates an internal sleeve 24 rigid with a plate 25 which drives, through balls 26, an annular member 27. The latter in turn drives, through balls 28, a member 29 connected through sleeve 30, with the driven shaft 5. I fix, on sleeve 30, for instance by screws or rivets 51, an elastic disc 52, for instance of the steel employed for making leaf springs, and I connect the free edge of this disc, for instance by means of screws or rivets 53, with the periphery of disc 29. With this arrangement, disc 52 ensures the desired drive between these two elements, while permitting the translatory displacement of disc 29, when the latter moves toward, or away from, annular member 27, for engaging or disengaging clutch 42. The elasticity of the disc may, in fact, be such that its yielding resistance intervenes for facilitating the movement of elements 27 and 29 away from each other when disengaging the clutch. Balls 26 and 28 are housed in circular and tapered recesses the walls of which are inclined in a manner analogous with walls 15.

It follows from the preceding explanations that the driven shaft 5, which is driven in first gear by gear trains 21 and 22, transmits to member 29 the effect of the resisting torque, whereas plate 25 is connected through the internal sleeve 24 with the gear train 22 through which the driving torque is transmitted. Due to the difference existing between the driving torque and the resisting torque, at slow speeds of the vehicle, angular displacements, limited by balls 28 and 26, exist between disc 29 and annular member 27, on the one hand, and between said annular member and plate 25, on the other hand. As a consequence of these angular displacements, I obtain, at the same time, a movement of the parts separated by the balls away from each other.

Plate 25 and annular member 27 constitute the tightening elements of a double clutch 31 intended to drive, through annular members 32, a disc 33 rigid with an intermediate sleeve 34 corresponding to second gear. This sleeve drives the driven shaft through gear trains 23 and 22, a free wheel $23^1$ being inserted in train 23.

In order to obtain the tightening (or operative engagement) of this clutch 31, I make use of masses 36, analogous to masses 10 and which act through balls 37 on plate 25 and on annular member 27. As above explained, I obtain, as a consequence of the radial movement of masses 36, under the effect of the rotation of plate 25, a movement of members 25 and 27 towards each other, which causes the clutch 31 to be engaged.

The control of clutch 31 is therefore obtained through the action of balls 26 which, under the effect of the resisting torque, tend to move elements 25 and 27 away from each other and through the simultaneous action of masses 36 which, under the effect of the speed, tend to bring the same elements toward each other. According to which of these two actions predominates, I therefore obtain the engagement or disengagement of clutch 31. The size and location of balls 26 and of masses 36 are determined in such manner that the action of masses 36 predominates for angular velocities of plate 25 corresponding to the drive in second gear.

Annular members 27 and 29 constitute the tightening elements of a clutch 42 intended to couple member 29 with an annular member 43 permanently driven by fly-wheel 3. This annular member 43 is capable of sliding axially with respect to said fly-wheel 3 while being constantly driven in rotation by said fly-wheel through the sliding connection 44. As, under all circumstances, members 27 and 29 turn at substantially the same speed and the only relative displacement other than a slight angular displacement that exists between these elements is an axial movement thereof either toward each other or away from each other, it is advantageous to provide between them a sliding connection 45. When the clutch is engaged the fly-wheel is directly connected to the driven shaft 5 through disc 29 and sleeve 30, these parts being connected together through means hereinafter described.

In order to obtain the engagement of the parts of this clutch 42, I make use of masses 46 analogous to masses 10 and 36 above referred to and which, through balls 47, housed in recesses, act on annular members 27 and 29. When the action of the speed which tends to displace masses 46 in the radial direction becomes more important than that of the resisting torque, which tends to move balls 28 away from the median position, clutch 42 is engaged and direct drive is obtained. The size and location of balls 28 and masses 46 are determined in such manner that the action of masses 46 predominates at the angular velocities of plate 25 which correspond to direct drive.

As above explained, it is necessary, especially for obtaining or cancelling direct drive, by engaging or disengaging clutch 42, that member 29 may slide axially with respect to the driven shaft 5, while being constantly driven in rotation together with it. In order to comply with this condition disc 29 might be slidably keyed on said shaft 5 or on sleeve 30, which is keyed on said shaft. The clutches are connected to elements such as 20, 24 and 5 through discs or blades 52¹, 52² and 52³ which are suitably elastic.

In the case of masses 36 and 46, the recesses provided in the adjacent faces of masses 36 and of parts 25 and 27 (or masses 46 and parts 27 and 29), instead of being conical on both sides, may be made as shown by grooves 15¹ and 15² (visible in Fig. 2). The object of this arrangement is to permit the relative angular displacement of a plate with respect to the other under the effect of balls 26 (or 28).

By making the centrifugal masses 10, 36 and 46 as above explained, I simplify their manufacture and their assembly. Furthermore, as the centrifugal masses bear exclusively through balls or the like on the parts that they are to control and which serve at the same time to their guiding, friction is reduced to a minimum and any jamming is made impossible, whereby the masses can work under the best possible conditions of operation.

With the arrangement above described, I obtain an automatic control clutch which is well adapted to the purpose set forth in the preamble of the description and with which the maximum application of the friction elements can be limited to the desired degree by the dimensions given to the balls 14, 16, 37 and 47 and their recesses. On the other hand, this tightening takes place in a gradual manner and exactly proportionally to the instantaneous value of the speed acting on masses 10, 36 or 46, since friction is practically eliminated. It follows that the disengagement of the clutch begins for a well determined speed, without any risk of adhesion of the clutch parts which generally delay the disengagement thereof.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A clutch which comprises, in combination, a rotary plate, a rotary disc and a rotary annular member both coaxial with said rotary plate and located on opposite sides thereof respectively, said disc and said plate constituting jaw-like elements movable axially in opposite respective directions, so as to hold between them said rotary plate or to release it, a U-shaped member forming a centrifugal mass having the inner faces of the branches of the U located at right angles to the above mentioned axes and adjacent respectively to the outer faces of said rotary disc and said rotary annular member, so as to form two pairs of adjacent faces, one belonging to the U-shaped centrifugal mass and the other to the rotary disc for the first pair, and one belonging to the rotary annular member and the other to the U-shaped centrifugal mass for the other pair, the two faces of each pair being provided with respective corresponding radial recesses having bottoms inclined in opposed respective directions, in section by an axial plane, and balls between said faces of each pair engaged each in two corresponding recesses of said respective faces of the pair, in such manner that the effect resulting from variations of the centrifugal force produces a displacement of said balls along said inclined bottoms and consequently an axial relative displacement of said rotary disc and annular member toward or away from said annular plate.

2. A clutch comprising a first rotatable element, and a second rotatable element composed of two parts on opposite sides of said first element, and means to bring said two parts together to clamp the first element therebetween, comprising a centrifugal mass member having portions thereof lying on opposite sides of the two parts of said second rotatable element, the opposed faces of such parts and portions having recesses therein provided with inclined walls, and balls in said recesses, whereby centrifugal force acting on said mass member moves the same to urge said parts together.

3. A clutch comprising a first rotatable element, and a second rotatable element composed of two parts on opposite sides of said first element, and means to bring said two parts together to clamp the first element therebetween, comprising a U-shaped mass portion having its legs lying on the outer sides of said parts, the opposed faces of such legs and parts having recesses therein provided with inclined walls, and balls in said recesses, whereby centrifugal force acting on said mass portion moves said legs to urge said parts together.

CHARLES EDOUARD HENRIOD, Fils.